United States Patent [19]
Brown et al.

[11] Patent Number: 5,454,270
[45] Date of Patent: Oct. 3, 1995

[54] HERMETICALLY SEALED PRESSURE SENSOR AND METHOD THEREOF

[75] Inventors: Clem H. Brown, Scottsdale; Daniel J. Wallace, Jr., Phoenix; Mario F. Velez, Phoenix, all of Ariz.

[73] Assignee: Motorola, Inc., Schaumburg, Ill.

[21] Appl. No.: 254,849

[22] Filed: Jun. 6, 1994

[51] Int. Cl.$^6$ ........................................ G01L 7/08
[52] U.S. Cl. ............................ 73/720; 73/721; 73/754; 73/726; 73/727
[58] Field of Search .......................... 73/720, 721, 754, 73/726, 727

[56] References Cited

U.S. PATENT DOCUMENTS

| | | | |
|---|---|---|---|
| 4,287,501 | 9/1981 | Tominga et al. | 73/720 |
| 4,314,225 | 2/1982 | Tominaga et al. | 73/721 |
| 4,833,920 | 5/1989 | Knecht et al. | 73/720 |
| 4,878,385 | 11/1989 | Lloyd | 73/720 |
| 4,942,383 | 7/1990 | Lam et al. | 73/720 |
| 5,134,887 | 8/1992 | Bell | 73/718 |
| 5,257,547 | 11/1993 | Boyer | 73/756 |

*Primary Examiner*—Richard E. Chilcot, Jr.
*Assistant Examiner*—Jewel V. Artis
*Attorney, Agent, or Firm*—Edward J. Mischen; Robert D. Atkins

[57] ABSTRACT

A differential pressure sensor (10) has a sensor die (16) attached to a stress isolation package base (12) with a bonding glass (27) having a similar coefficient of thermal expansion. The bonding glass, and alternately an aluminum layer, provides a hermetic seal between the stress isolation base and sensor die. Pressure is applied to the sensor die port (24). A plastic housing (14) is attached to the stress isolation base with an adhesive (29). A port (23) in the plastic housing is filled with a silicone gel (22). A second pressure source is transferred by way of the silicone gel to the sensor die. Any hostile chemical entering the via contacts the first surface of the sensor die to assert pressure against a transducer circuit (25) to generate the electrical signals representative of the applied pressure but are isolated from the sensitive interconnects by the hermetic seal.

17 Claims, 1 Drawing Sheet

HERMETICALLY SEALED PRESSURE SENSOR AND METHOD THEREOF

BACKGROUND OF THE INVENTION

The present invention relates in general to pressure sensors and, more particularly, to a differential pressure sensor suitable for use in a hostile environment.

Differential pressure sensors are commonly used to monitor fluid and gas pressures such as oil products, hydraulic braking, steam, radiator, air conditioning pump, and boiler pressures. In many applications, the fluid or gas is a hostile chemical such as gasoline, freons, ammonia based compounds, butanes, chlorinated solvents, alcohols, or other fuels. Typically, one side of the pressure sensor is exposed to the hostile environment. The opposite side of the sensor is exposed to a less active medium such as an air reference.

A strain gauge piezoresistive type pressure sensor is often used in hostile environments. The strain gauge type pressure sensor converts a mechanically sensed differential pressure to an electrical signal representative of the differential pressure. To protect the circuitry from the adverse environment, the sensor may be mounted within a stainless steel body that is welded shut. While the strain gauge type sensor is media and pressure compatible, it is expensive to manufacture and does not lend itself to applications where space and weight considerations are important. Additionally, it is known that the strain gauge type pressure sensor is difficult to adjust for varying temperature conditions within the application.

Another type of pressure sensor that is presently used is the ceramic capacitive pressure transducer. The ceramic capacitive pressure transducer is generally limited to low pressure applications and is less accurate than the strain gauge sensor. The ceramic capacitive sensor also requires an expensive, metal type welded housing structure.

Sensors that are designed to exhibit a high degree of accuracy often incorporate a silicon pressure sensor die. The silicon pressure sensor die resolves weight and size issues, but presents new challenges in relation to packaging for a hostile environment. Moreover, since the silicon die are inherently fragile, the packaging scheme must also include die stress relief. Attachment of the sensor die to their respective housings is accomplished by anodically bonding the sensor die to a borosilicate glass platform, or by using a flexible silicone adhesive to attach the sensor die to a package body.

In the case where borosilicate glass is used, the sensor lends itself to high pressure applications. Unfortunately, the cost of conforming the glass to a final package is often excessive. If the glass cannot be made to conform to the final package shape in a cost effective manner, and therefore cannot form a hermetic seal, the resulting device becomes media incompatible with hostile environments. The use of flexible silicone adhesives to attach pressure sensor die and provide conformal packaging is generally limited by the media compatibility of the adhesive.

Hence, a need exists for a precision differential high pressure sensor that is small in size, lightweight, low in cost, and suited for use in hostile environments.

DETAILED DESCRIPTION OF THE PREFERRED EMBODIMENT

The present invention provides a hermetically sealed electronic differential pressure sensor device for detecting a wide range of fluid or gas pressures and for supplying an electrical signal representative of the differential pressures applied to the device. A pressure sensitive semiconductor die is attached to one surface of a package base using a glass bonding agent that has a compatible coefficient of thermal expansion. The glass additionally provides a hermetic seal between the package base and the sensor die. The package base is selected of a material that also provides stress isolation for the sensor die.

The package base includes a port that provides an opening for a first differential pressure to be applied to one surface of the sensor die. A plastic housing surrounds the periphery of the sensor die and is attached to the package base using a compatible mating adhesive. Package leads are constrained by the plastic housing. Subsequent electrical connections via wirebonds are made between the sensor die and the package leads to carry electrical signals to external connections on the package body. The plastic housing includes a second port located over the second surface of the sensor die. The plastic housing port is filled with a silicone gel. A second differential pressure is applied to the second port and is transferred via the silicone gel to the second surface of the sensor die. The sensor die flexes in response to the differential pressure and converts the mechanically sensed differential pressures to an electrical signal connected to the exterior of the sensor package via bond wires and a package leadframe.

The pressure sensor device provides an electronic silicon pressure sensing die in a package that can operate in many environments. The pressure sensor is designed to be media compatible and operate in environments such as fuel systems, hydraulic systems, aggressive vapor and liquid chemical environments such as cooling/heating systems and chemicals that may be either polar, non-polar, low or high acidity, or combinations thereof. In addition, the pressure media may be in liquid or gaseous form and be of temperatures in the ranges of $-40°$ C. to $+150°$ C. The device must maintain accuracy of pressure over the range of temperature and not allow the package to cause the silicon die to interpret package related stress as a false pressure.

Figure 1:
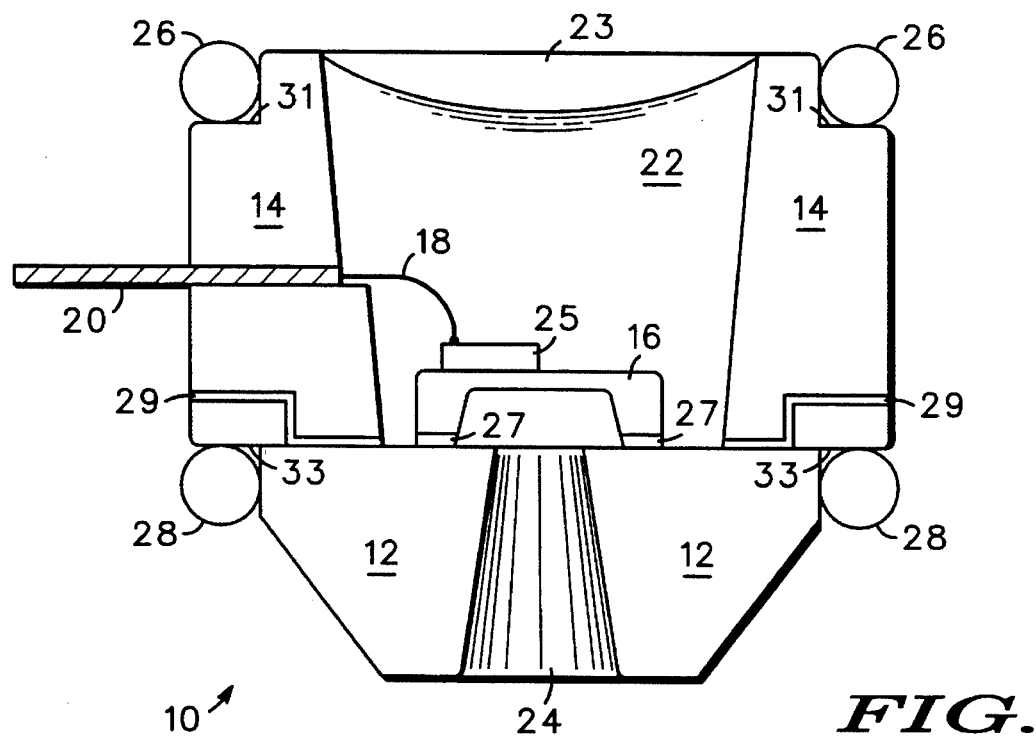
FIG. 1 illustrates a cross sectional view of a hermetically sealed differential electronic pressure sensor.

Referring to FIG. 1, a cross section of differential pressure sensor 10 is shown, including silicon sensor die 16 mounted to stress isolation base 12 using glass bonding agent 27. Stress isolation base 12 is made of a ceramic material such as alumina, or other material having a similar coefficient of thermal expansion as silicon. A port 24 located near the center of stress isolation base 12 provides an opening for a first differential pressures to be applied to a first surface of sensor die 16. The first surface of sensor die 16 may be exposed to a hostile environment. A piezoresistive transducer circuit 25 is disposed on a second surface of sensor die 16 for converting the flexing of sensor die 16 into an electrical signal.

Plastic housing 14 is attached to stress isolation base 12 using a mating adhesive 29. Plastic housing 14 houses leadframe 20. Bondwire 18 is used to interconnect piezoresistive transducer circuit 25 to leadframe 20 thus channeling the electrical signal to the exterior of pressure sensor 10. Note that although multiple leads are used to perform the task, only one lead of leadframe 20 and only one bondwire 18 is shown in FIG. 1.

Port 23 is located near the center of plastic housing 14 and positioned above sensor die 16. Port 23 is filled with silicone gel 22. The second differential pressure is applied to port 23 and transfers through silicone gel 22 to sensor die 16. Port retainer detent 31 is annularly disposed around the circumference of plastic housing 14. Port retainer detent 31 serves as a seat for o-ring seal 26 which provides isolation to channel the second external differential pressure into port 23. Port retainer detent 33 is annularly disposed around the circumference of stress isolation base 12. Port retainer detent 33 serves as a seat for o-ring seal 28 which provides isolation to channel the first external differential pressure into port 24. Seals 26 and 28 are elastomeric and are media compatible, i.e. made to function in the external environment, being made of nitrile rubber or like materials and are held in place by tension. Seals 26 and 28 further reduce vibration and mounting stresses in pressure sensor 10.

Sensor die 16 is silicon with a transducer diaphragm formed by micro-machining or silicon etching process into a square pattern approximately 0.001 inches thick. Stress isolation base 12 is molded or machine formed of a ceramic material that provides stress isolation by having a similar coefficient of thermal expansion as the silicon die. The stress isolation materials include various grades and compositions of alumina, cordierite, and steatite. Stress isolation base 12 must also have non-porosity characteristics such that hermetic qualities are preserved.

Sensor die 16 is attached to stress isolation base 12 with a glass bonding agent 27. Materials for bonding agent 27 include glass or metal filled glass having a similar coefficient of thermal expansion as sensor die 16 and stress isolation base 12. Glass bonding agent 27 must also have non-porosity characteristics such that hermetic qualities are preserved. Glass bonding agent 27 is applied with a thickness of 0.5 to 4.0 mils to the mounting surface of sensor die 16, i.e. the diaphragm cavity side perimeter, or the mounting surface of stress isolation base 12, or both surfaces as a film or as a paste deposition. A hermetic seal is achieved by firing or reflowing the bonding glass at a temperature equal to or above 400° C. in order to join sensor die 16 to stress isolation base 12.

Plastic housing 14 provides a housing and electrical interconnect for sensor die 16. Materials for the plastic housing 14 include organic epoxies or plastics filled with inorganic matter. The sensor die and stress isolation base subassembly are fastened with a semi-rigid bonding agent mating adhesive 29 having a thickness of 4.0 mils to plastic housing 14. Mating adhesive 29 materials that provide stress isolation by allowing independent thermal expansion of plastic housing 14 include organic epoxies, or elastomers filled with inorganic matter. Mating adhesive 29 further provides a seal between the interior of the package and the exterior, other than through the ports.

A piezoresistive transducer circuit 25 is disposed on the transducer diaphragm to provide a resistance in the path of externally applied direct current. Two current taps or electrical connections are made along the length of the primary resistor. Any change in the resistance film caused by pressure results in a change in the current flow in that respective resistor and appears as a voltage potential change on the taps. The diaphragm and the sensor silicon die are one integral device. The sensor die and stress isolation base subassembly is electrically connected to plastic housing 14 housing through leadframe 20 with bondwire 18. Bondwires wires 18 are preferrably gold and applied via thermosonic bonding. Sensor die 16 is protected with silicone gel 22 filled in port 23, which is a form of low durometer elastomeric coating.

Figure 2:
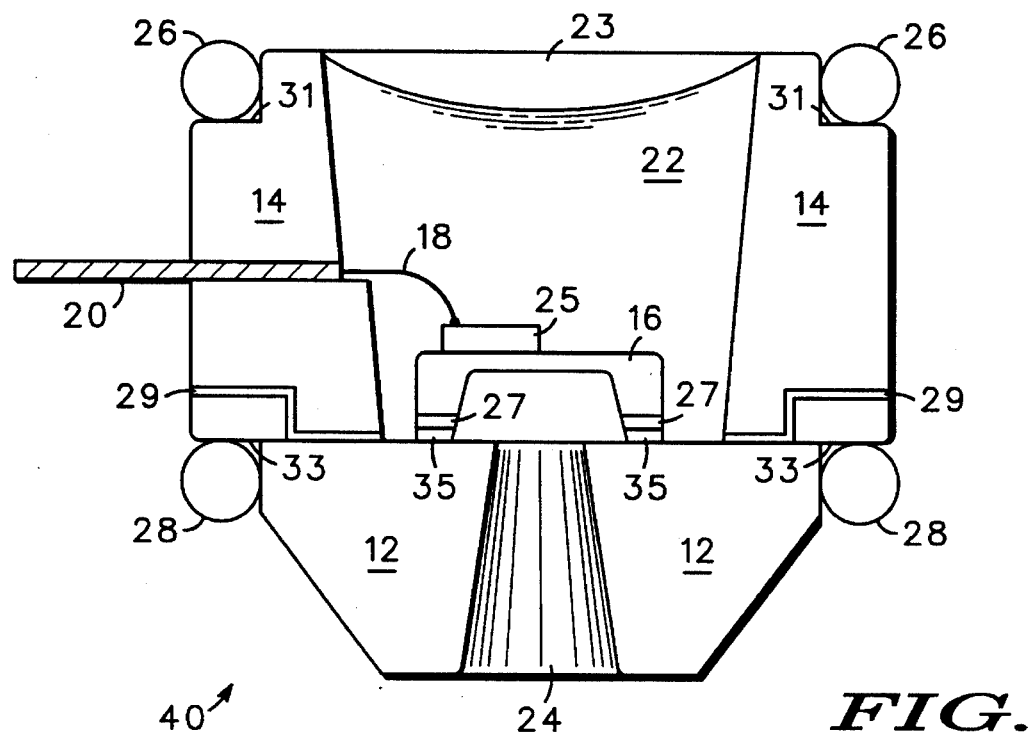
FIG. 2 illustrates a cross sectional view of an alternate embodiment of the hermetically sealed differential electronic pressure sensor.

Turning to FIG. 2, pressure sensor 40 is shown with aluminum layer 35 between glass bonding agent 27 and stress isolation base 12. Components having the same reference number assigned in FIG. 1 provide a similar function. Aluminum layer 35 is deposited onto stress isolation base 12 by evaporation techniques known in the art. The area of deposition includes the surface area of stress isolation base 12 that is to be in common with sensor die 16 plus a typical overlap of the inner and outer perimeters of sensor die 16 mating surface by 20 mils. The purpose of the overlap is to facilitate die misalignment. The thickness of aluminum layer 35 is five microns. The glass bonds to the aluminum and enhancement to the reliability of the hermetic seal occurs as a result.

Sensor die 16 is attached to aluminum layer 35 with a glass bonding agent 27 which comprises glass or metal filled glass having a similar coefficient of thermal expansion as sensor die 16 and stress isolation base 12. Glass bonding agent 27 must also have non-porosity characteristics such that hermetic qualities are preserved. Glass bonding agent 27 is applied either to the mounting surface of sensor die 16, or the surface of aluminum layer 35, or both surfaces as a film or as a paste deposition. A hermetic seal is achieved by firing or reflowing the bonding glass at a temperature equal to or above 400° C. which joins sensor die 16 to stress isolation base 12. The bond of sensor die 16 to stress isolation base 12 through aluminum layer 35 is refined due to the physical characteristics of aluminum layer 35. Aluminum is generally covered with an oxide layer that is formed naturally when the aluminum is exposed to atmospheric conditions. The oxide layer has physical characteristics similar to glass bonding agent 27 and to sensor die 16 that optimize the interface of the components to provide a reliable bonding interface.

By now it should be appreciated that a differential sensor packaging scheme has been presented that incorporates a silicon bulk micro-machined differential pressure sensor and transducer circuit that is hermetically sealed to a stress isolation sub-assembly. The package is capable of providing sensing in extreme environments and at elevated pressures while maintaining a hermetic seal.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A differential pressure sensor, comprising:

a base having a first port for receiving a first pressure, said base having a coefficient of thermal expansion;

a sensor die mounted to said base and coupled for receiving said first pressure from said first port, said sensor die having a coefficient of thermal expansion similar to said coefficient of thermal expansion of said base;

a glass bonding agent disposed between said sensor die and said base for providing a hermetic seal between said sensor die and said base, said glass bonding agent having a coefficient of thermal expansion similar to said coefficients of thermal expansion of said base and said sensor die for diminishing effects of thermal stress upon said sensor die; and a plastic housing having a second port positioned over said sensor die for receiving a second pressure, said plastic housing having a mating surface attached to a mating surface of said base.

2. The differential pressure sensor of claim 1 wherein said base is made of a ceramic having a coefficient of thermal expansion similar to said sensor die.

3. The differential pressure sensor of claim 2 further including a silicone gel disposed in said second port of said plastic housing.

4. The differential pressure sensor of claim 3 wherein said sensor die includes:

- a transducer diaphragm that flexes in response to a difference of said first and second pressures;
- a piezoresistive transducer circuit mounted to said transducer diaphragm that changes resistance in response to said flexing of said transducer diaphragm; and
- a bonding-wire coupled between a tap point of said transducer circuit and a conductive lead of said plastic housing.

5. The differential pressure sensor of claim 4 wherein said plastic housing attaches to said mating surface of said base with an adhesive made of an epoxy that provides stress isolation by allowing thermal expansion of said plastic housing.

6. A method of sealing a differential pressure sensor, comprising the steps of:

- providing a base with a port for receiving a first pressure, said base having a coefficient of thermal expansion;
- mounting a sensor die on said base with a glass bonding agent to provide a hermetic seal between said sensor die and said base while said sensor die receives said first pressure, said sensor die and said glass bonding agent each having a coefficient of thermal expansion that is similar to said coefficient of thermal expansion of said base to diminish effects of thermal stress upon said sensor die; and
- providing a plastic housing with a port positioned over said sensor die for receiving a second pressure; and
- mounting a mating surface of said plastic housing to a mating surface of said.

7. The method of claim 6 wherein said base is made of a ceramic having a coefficient of thermal expansion similar to said sensor die.

8. The method of claim 7 further including the step of filling said second port of said plastic housing with a silicone gel for transferring said second pressure to said sensor die.

9. The method of claim 8 further including the steps of:

- providing a transducer diaphragm that flexes in response to a difference of said first and second pressures;
- providing a piezoresistive transducer circuit mounted to said transducer diaphragm that changes resistance in response to said flexing of said transducer diaphragm; and
- providing a bonding wire coupled between a tap point of said transducer circuit and a conductive lead of said plastic housing.

10. The method of claim 9 further including the step of attaching said plastic housing to said mating surface of said base with an adhesive made of an epoxy that provides stress isolation by allowing thermal expansion of said plastic housing.

11. A differential pressure sensor, comprising:

- a stress isolation base having a mating surface and having a port for receiving a first pressure;
- a sensor die mounted to said stress isolation base and coupled for receiving said first pressure;
- an aluminum layer disposed on said stress isolation base;
- a bonding agent disposed between said aluminum layer and said sensor die for providing a hermetic seal between said sensor die and said stress isolation base;
- a plastic housing having a port positioned over said sensor die for receiving a second pressure, said plastic housing having a mating surface attached to said mating surface of said stress isolation base; and
- a silicone gel disposed in said port of said plastic housing.

12. The differential pressure sensor of claim 11 wherein said stress isolation base is made of a ceramic having a having a coefficient of thermal expansion similar to said sensor die.

13. The differential pressure sensor of claim 12 wherein said bonding agent is made of glass.

14. The differential pressure sensor of claim 13 wherein said sensor die includes a transducer diaphragm that flexes in response to a difference of said first and second pressures.

15. The differential pressure sensor of claim 14 wherein said sensor die includes a piezoresistive transducer circuit mounted to said transducer diaphragm that changes resistance in response to said flexing of said transducer diaphragm.

16. The differential pressure sensor of claim 15 wherein said sensor die includes a bonding wire coupled between a tap point of said transducer circuit and a conductive lead of said plastic housing.

17. The differential pressure sensor of claim 16 wherein said plastic housing attached to said mating surface of said stress isolation base with an adhesive made of an epoxy that provides stress isolation by allowing thermal expansion of said plastic housing.

* * * * *